April 30, 1968  J. M. BILHORN  3,380,857
HERMETIC SEAL CLOSURE
Filed Nov. 22, 1965
*Fig. 1*
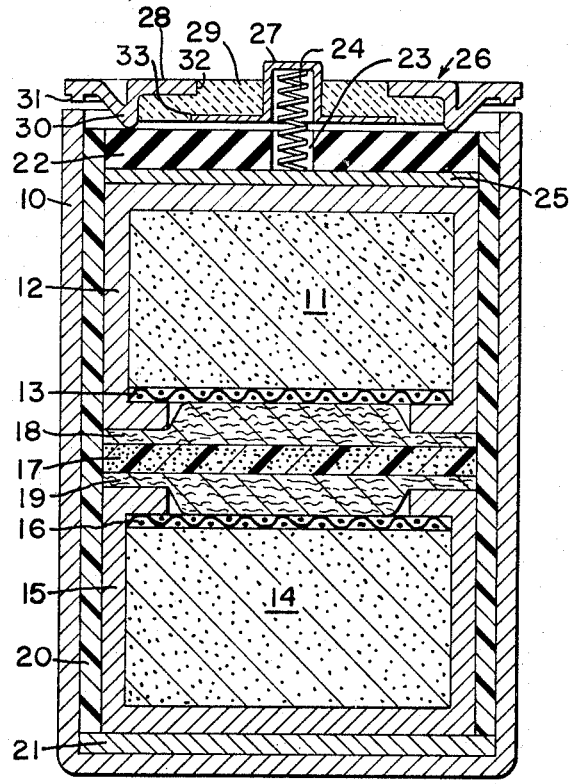
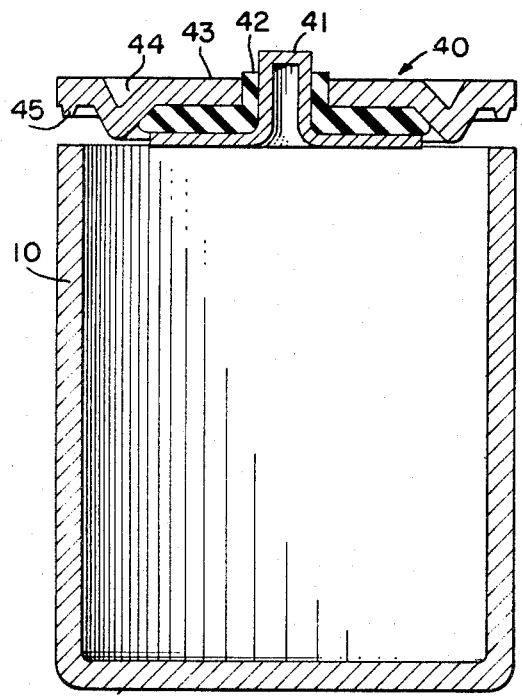
*Fig. 2*
INVENTOR:
JOHN M. BILHORN
BY:
ATTORNEY

United States Patent Office 3,380,857
Patented Apr. 30, 1968

3,380,857
HERMETIC SEAL CLOSURE
John M. Bilhorn, Edgerton, Wis., assignor to The Electric Storage Battery Company, a corporation of New Jersey
Filed Nov. 22, 1965, Ser. No. 509,078
9 Claims. (Cl. 136—133)

ABSTRACT OF THE DISCLOSURE

A hermetic seal closure having an inner metallic terminal member, an outer metallic rim member and an insulating material separating said terminal member and said rim member. An essential feature comprises providing a bend in the rim member which abuts the insulating material for the purpose of placing the insulating material in radial compression. The insulating material may comprise a ceramic, glass or rubber material. The insulating material, particularly a ceramic, is stronger under compression and this is the reason for providing the bend in the rim member. An additional feature is the provision of a coined projection on the underside of the outer edge of the rim member for the purpose of welding the closure to a container.

---

This invention relates to a hermetic seal closure, and in particular, it relates to a hermetic seal closure for a primary or secondary battery or cell of the type employing an alkaline electrolyte.

Alkaline solutions are well known for their excellent surface wetting properties. The battery industry, in particular, is plagued with the problem of alkaline electrolyte leakage. This problem has been particularly troublesome in the production of a sealed, rechargeable alkaline cell which must be hermetically sealed to retain the electrolyte and gases which are eolved within the container during the operation of the cell. In addition to preventing electrolyte leakage, the seal closure of a sealed battery or cell must be able to withstand substantial inernal cell pressure caused by the evolved gases.

It is an obect of this invention to provide a hermetic seal closure which effectively prevents electrolyte leakage when used to seal a primary or secondary battery or cell.

Another object of the invention is to provide a hermetic seal closure having sufficient mechanical strength properties to withstand the substantial internal pressure developed within a sealed battery or cell.

Other objects and advantages of this invention will be apparent to those skilled in the art in view of the following dscription, and with particular referenece to the drawings in which:

FIGURE 1 is a sectional view of a sealed cell, prior to sealing, which employs a metal-ceramic hermetic seal closure in accordance with this invention; and FIGURE 2 is a sectional view of an empty cell container and a metal-rubber hermetic seal closure in accordance with this invention.

In the development of sealed electric batteries and cells, some confusion has arised as to the exact meaning of the term "hermetically sealed." As used in this specification and the claims which follow, the term "hermetic seal closure" indicates a closure which is fused to the container to be closed. As a result of the fusion technique for closing, a substantially helium tight closure is produced.

It has been discovered that an effective hermetic seal closure especially useful for electric batteries can be manufactured using a specially designed outer metallic rim member bonded to either a ceramic, glass or rubber material which electrically insulates the metal rim from an inner metallic member of the closure which functions as one of the battery terminals. A hermetic seal is achieved by fusing the closure to the container to be closed in such a manner that the insulating material and the contents of the container are not damaged. The hermetic seal closure can even be fused to a container by resistance welding without damaging the closure or the contents of the container.

The basic principle of this invention comprises designing the seal closure in such a manner that the ceramic, glass or rubber insulating material is maintained under compressive stress. This is essential to the invention because the insulating material, particularly the ceramic, is stronger under compression, and accordingly, the seal closure can withstand greater pressures generated within the container without failure.

Several design features are used to maintain the insulating material under compression, the most important of which is the provision in the outer metallic rim member of a bend or depression abutting the insulating material. The bend is located between that portion of the outer rim attached to the insulating material and the outer edge of the rim member. It is generally preferred to use a V-shaped bend when the insulating material is a ceramic or glass material and a U-shaped bend with a rubber insulating material. In addition to the depressed rim member, maintenance of the insulating material under compression is aided by selecting the metal for the rim member and the inner metallic terminal member so that the difference in coefficient of thermal expansion between the insulating material and the metal parts will result in a compressive stress in the insulating material at the site of the bond to the metal parts. An additional factor which helps to maintain compression is that the metal parts of the closure are designed to overlap, particularly with a rubber insulating material, so as to decrease the shearing moment on the insulating material. Furthermore, it is preferred to prepare the outer rim member from a metal having a thicker section than the inner terminal member.

Conventional techniques are employed to bond the insulating material to the metal parts. When using a ceramic insulating material, the surface of the ceramic is metallized such as by painting a powdered metallic slurry onto the surface and then heating it to bond the metal to the ceramic. When the metal parts of the closure are nickel or nickel plated steel, the powdered metallic slurry may comprise a molybdenum-manganese mixture. An alternative procedure for metallizing the ceramic comprises immersing it in a solution such as a nickel phosphide slurry. Of course it must be remembered that the purpose of the insulating material is to electrically insulate the two metal parts of the closure, and so only that portion of the ceramic which is bonded to the metal parts should be metallized. This can be accomplished by masking the portion which is not bonded to the metal parts, or by coating the entire insulating material and then removing the metal coating from that portion which is not to be bonded by grinding. In addition to the metallizing materials previously mentioned, zirconium hydride is often used when bonding to nickel-iron parts is required.

Simultaneously with or after the surface of the ceramic has been metallized, the metal parts are bonded to the ceramic using a silver or silver alloy braze. At the brazing temperatures, the brazing metal flows to fill all spaces between the insulating material and the metal parts. As the braze solidifies upon cooling and the metal parts continue to cool, the metal parts contract to a greater degree than the ceramic, and hence, the vertical portion of the ceramic-metal seal is placed in radial compression at the ceramic-metal interface.

The brazing material which is used must be ductile so as to prevent failure of the bond under stress. If used to seal an alkaline cell, the braze material must also be corrosion resistant to alkaline electrolyte. It is generally preferred to use a silver or silver-indium alloy brazing material.

In addition to the metallizing-brazing technique for bonding the ceramic insulating material to the metal parts, it has also been discovered than an epoxy resin sealant can be used to bond the ceramic to the metal parts. Using an epoxy resin sealant, such as that sold under the trademark Bondmaster, avoids the problem of possible short circuits across the metallized insulating material.

When glass is used as the insulating material, the technique used to bond the glass to the metal parts comprises heating the glass to the temperature at which it softens, placing the metal parts in contact with the softened glass, and permitting the glass to cool while in contact with the metal parts. This is a conventional procedure for bonding glass and metal.

It must be noted that the ceramic or glass material which is used as the insulating material for the closure of this invention must be corrosion resistant to alkaline electrolyte. The ceramic or glass must be capable of being securely bonded to the metal parts of the closure, and they must have sufficient compressive strength to withstand the pressures to which the closure will be subjected. A high alumina ceramic (about 95% $Al_2O_3$) containing less than about 2% silica and trace amounts of iron, titania and zirconia has been found to be particularly satisfactory.

When the insulating material is rubber, it is important that there be a substantial overlap of the outer rim member and the inner metal member with the rubber material positioned between the overlapping metal parts. This greater overlap for the rubber material is needed to provide a greater rubber-metal interface, because the bond between the rubber and metal parts is weaker than the ceramic or glass to metal bond. The requirement for a differential in the coefficient of thermal expansion for the metal parts and a substantially greater thickness for the outer rim member are not as important when using a rubber insulating material.

Various types of synthetic rubber can be used as the insulating material for the hermetic seal closures of this invention. Examples of suitable rubber materials are butyl rubber, nitrile rubber and neoprene. In preparing the rubber to metal bond, the portion of the metal parts in contact with the rubber have a rubber primer coating applied thereto, and then are immediately brought into contact with the rubber insulating material. A typical commercial rubber primer is the material sold under the trademark "Ty-Ply" which is available in various grades for use with different types of rubber. After the rubber primer coated metal parts and the rubber material are brought into contact, the metal parts are compressed upon the rubber, and while under compression, they are heated to cure the rubber and complete the rubber to metal bond.

As previously mentioned, the most important feature of the closure of this invention is the provision of a bend in the outer metal rim member. It is generally preferred to use a more rounded U-shaped bend when the insulating material is rubber.

One of the primary advantages of a closure made in accordance with this invention is that it can be fused to a container by means of a projection weld, and thereby hermetically seal the container. While projection or resistance welding is conventional, when sealing an electric battery it is essential to minimize the heat so as to avoid damage to the insulating material of the closure and the electrochemically active components of the battery or cell. For example, the electrolyte may be boiled off if too much heat is present. In addition, the heat must be controlled to prevent thermal shock to the insulating material which may create crazing.

When sealing a cylindrical battery container having a 1.3 inch outside diameter, an unusually large ring weld is required. In making such a weld, the current may range from about 18,000 to 43,000 amperes for 2 to 9 cycles of a 60 cycle AC current source. The lower current is used in the case of steel parts, and a higher current is required when nickel or nickel-iron parts are used. This current produces sufficient heat that it is preferred to provide a coined projection on that portion of the outer metal rim member which is welded to the container. This projection must be coined in order to prevent its collapse when subjected to the welding current.

The metal parts of the closure, outer rim member and inner terminal member, can be prepared from a variety of metals. Metals found to be satisfactory include steel, nickel, nickel plated steel and nickel alloys such as Kovar nickel-iron-cobalt alloy. When the insulating material is a ceramic or glass, it is generally preferred to use nickel or nickel alloy metal parts for they form better bonds with the metallized insulating material because they can readily be selected to provide the desired coefficient of thermal expansion differential. It is preferred to use steel parts when the insulating material is rubber, because of its lower cost and greater strength.

A more detailed description of the closure of this invention is available by referring to the drawings.

As shown in FIGURE 1, an alkaline cell which is to be hermetically sealed comprises a container 10 which houses a positive active material 11, such as mercuric oxide, silver oxide or nickel hydroxide, held in place by an active material container 12 and a retaining screen 13 and a negative active material 14, such as cadmium or zinc, held in place by an active material container 15 and a retaining screen 16. The positive and negative electrodes are separated by a barrier 17 which may be microporous plastic or cellophane and absorbent separators 18 and 19 of nonwoven cellulosic or nylon which are interposed between the barrier 17 and the positive and negative electrodes respectively.

The electrodes are electrically insulated from the side of the container 10 by means of a plastic insulator sleeve 20. The negative electrode is electrically connected to the bottom of the container 10 by means of a metallic contact disc 21, and this enables the container 10 to serve as the negative terminal. At the top of the cell, there is a resilient compression plug 22 having a centrally disposed annulus 23 through which passes a contact spring 24 which makes electrical contact with the positive electrode through a metallic contact disc 25. It should be noted that all of the alkaline electrolyte solution is contained in the pores of the electrodes and the absorbent separators.

The alkaline cell illustrated in FIGURE 1 is to be hermetically sealed by means of a closure 26 made in accordance with this invention. The closure 26 comprises an inner metallic terminal member 27 which is electrically connected to th positive electrode by the contact spring 24 and the contact disc 25, and thereby, the member 27 serves as the positive terminal. The terminal member 27 is electrically insulated from an outer metallic rim member 27 by a ceramic or glass insulating material 29. The terminal member 27 has an upwardly projecting center portion which passes through an opening in the insulating material 29 and a flange which extends outwardly to an edge 33 and said flange overlaps the inner edge 32 of the rim member. An essential feature of the invention is the provision of a V-shaped bend 30 in the rim member 28 by a ceramic or glass insulating material 29. The the outer edge of the rim member 28 there is a coined projection 31 which is projection welded to the upper edge of the cell container 10. It should be noted that the rim member 28 is approximately twice as thick as the terminal member 27 and there is a slight overlap of these members with insulating material disposed therebetween. It is desirable to leave a slight clearance between the inner edge 32 of the rim member 28 and the insulating material 29 and also between the edge 33 of the terminal member 27 and the insulating material 29 to allow for expansion during brazing and welding procedures. These clearances may later be filled with brazing material.

The closure illustrated in FIGURE 1 utilizes a ceramic (about 95% alumina) as the insulating material. It is generally preferred to preparfe both the outer rim member and the inner terminal member from a nickel-iron cobalt alloy (Kovar alloy) for this alloy provides the desired coefficient of thermal expansion differential. A preferred thickness for the rim and terminal members is 30 mils and 15 mils respectively.

FIGURE 2 illustrates a closure in accordance with this invention which utilizes a rubber insulating material. The cell container 10 is shown without the cell components. The closure 40 comprises an inner terminal 41, a rubber insulating material 42 and an outer rim member 43. The outer rim member has a U-shaped bend 44 which abuts the insulating material 42. It should be noted that there is a substantial overlap of the outer rim member 43 and the inner terminal member 41, with the insulating material 42 interposed between the overlap. As previously mentioned, the bend 44 used with a rubber insulating material is more rounded and is referred to as being U-shaped in contrast to the V-shaped bend used with a ceramic. A coined projection 45 is located on the outer edge of the rim member 43, and this projection is fused tothe cell container 10 by means of projection welding.

After having referred to the drawings, it is considered that the function performed by th principal feature of this invention, the bend or deflection in the outer rim member, can be more easily understood. After the closure is welded to the container, the outer edge of the rim member is firmly anchored to the container. As pressures build up within the sealed container, such as by gas evolution, a force is exerted against the underside of the closure. This force exerted against the underside of the closure causes the insulating material to be placed under axial compression in addition to the radial compression developed by the contraction of the metal parts to a greater degree than the insulating material during sealing of the metal parts of the closure to the insulating material. This bend or deflection feature is essential to the maintenance of a satisfactory hemetic seal closure, for the insulating material, particularly a ceramic material, is substantially stronger under radial compression.

Having completely described this invention what is claimed is:

1. A hermetic seal closure comprising an inner metallic terminal member, an outer metallic rim member and an insulating material interposed between said terminal member and said rim member and securely bonded thereto, said terminal member having an upwardly projecting center portion passing through an opening in the insulating material and a flange extending outwardly and overlapping the inner edge of the rim member, said rim member having a bend therein located between that portion of said rim member bonded to said insulating material and outer edge of said rim member and said bend abutting said insulating material for the purpose of placing said insulating material in radial compression.

2. A hermetic seal closure in accordance with claim 1 in which the insulating material is a ceramic, glass or rubber material.

3. A hermetic seal closure in accordance with claim 1 in which the insulating material is selected from a ceramic or glass material and said bend is V-shaped.

4. A hermetic seal closure in accordance with claim 1 in which the insulating material is a rubber material and said bend is U-shaped.

5. A hermetic seal closure in accordance with claim 1 in which the underside of the outer edge of said rim member is formed into a coined projection.

6. A hermetic seal closure in accordance with claim 1 in which the insulating material is a ceramic, said rim metmber has a thickness substantially greater than said terminal member, and said rim member has a V-shaped bend.

7. A hermetic seal closure in accordance with claim 6 in which said insulating material is a ceramic comprising about 95% alumina.

8. A hermetic seal closure in accordance with claim 1 in which the insulating material is a rubber material, said rim member and said terminal member have a substantial overlap with said rubber insulating material interposed between the overlap, and said rim member has a U-shaped bend.

9. A hermetic seal closure in accordance with claim 8 in which said rubber insulating material is butyl rubber, nitrile rubber or neoprene.

References Cited

UNITED STATES PATENTS

| | | | |
|---|---|---|---|
| 2,066,856 | 1/1937 | Rose | 250—27.5 |
| 3,005,865 | 10/1961 | Jonsson | 136—136 |
| 3,294,591 | 12/1966 | Jordan | 136—133 |

FOREIGN PATENTS

| | | |
|---|---|---|
| 1,383,391 | 11/1964 | France. |

WINSTON A. DOUGLAS, *Primary Examiner.*

ALLEN B. CURTIS, *Examiner.*

D. L. WALTON, *Assistant Examiner.*